United States Patent
Smith

(10) Patent No.: US 9,964,192 B2
(45) Date of Patent: May 8, 2018

(54) BI-DIRECTIONAL HYDRODYNAMIC THRUST WASHER FOR A TORQUE CONVERTER

(71) Applicant: Schaeffler Technologies AG & Co. KG, Herzogenaurach (DE)

(72) Inventor: Matthew Smith, Wooster, OH (US)

(73) Assignee: Schaeffer Technologies AG & Co. KG, Herzogenaurach (DE)

( * ) Notice: Subject to any disclaimer, the term of this patent is extended or adjusted under 35 U.S.C. 154(b) by 48 days.

(21) Appl. No.: 14/959,329

(22) Filed: Dec. 4, 2015

(65) Prior Publication Data
US 2017/0159781 A1    Jun. 8, 2017

(51) Int. Cl.
*F16H 41/28*    (2006.01)
*F16H 41/24*    (2006.01)

(52) U.S. Cl.
CPC .............. *F16H 41/24* (2013.01); *F16H 41/28* (2013.01)

(58) Field of Classification Search
CPC .......... F16B 43/00; F16H 41/28; F16H 41/24; F16C 17/04; F01D 25/28
See application file for complete search history.

(56) References Cited

U.S. PATENT DOCUMENTS

| | | | |
|---|---|---|---|
| 6,231,309 B1* | 5/2001 | Popoola | B23H 9/00 415/200 |
| 6,502,994 B2* | 1/2003 | Jackson | F16C 17/04 384/368 |
| 2009/0159388 A1* | 6/2009 | Scordino | F16H 45/02 192/3.29 |
| 2015/0184701 A1 | 7/2015 | Lindemann et al. | |

FOREIGN PATENT DOCUMENTS

CA    745520    11/1966

* cited by examiner

*Primary Examiner* — F. Daniel Lopez
*Assistant Examiner* — Abiy Teka
(74) *Attorney, Agent, or Firm* — Davidson, Davidson & Kappel, LLC

(57) ABSTRACT

A thrust washer for a torque converter is provided. The thrust washer includes an inner circumferential surface, an outer circumferential surface and a first axial surface extending from the inner circumferential surface to the outer circumferential surface. The axial surface includes a plurality of arcuate sections and a plurality of grooves circumferentially between the arcuate sections. Each of the arcuate sections includes an arcuate axial surface including a first section, a second section and a third section. The first and third sections extend circumferentially away from the second section in opposite directions and extend axially inward from the second section. A torque converter and a method for forming at least one torque converter are also provided.

20 Claims, 3 Drawing Sheets

BI-DIRECTIONAL HYDRODYNAMIC THRUST WASHER FOR A TORQUE CONVERTER

The present invention relates generally to torque converters and more specifically to a torque converter thrust washer.

BACKGROUND OF INVENTION

U.S. Publication No. 2015/0184701 A1 and CA 745520A disclose torque converter thrust washers.

BRIEF SUMMARY OF THE INVENTION

A thrust washer for a torque converter is provided. The thrust washer includes an inner circumferential surface, an outer circumferential surface and a first axial surface extending from the inner circumferential surface to the outer circumferential surface. The axial surface includes a plurality of arcuate sections and a plurality of grooves circumferentially between the arcuate sections. Each of the arcuate sections includes an arcuate axial surface including a first section, a second section and a third section. The first and third sections extend circumferentially away from the second section in opposite directions and extend axially inward from the second section. A torque converter and a method for forming at least one torque converter are also provided.

A torque converter is also provided. The torque converter includes the thrust washer and a stator arranged axially adjacent to the thrust washer.

A method of forming at least one torque converter is also provided. The method includes forming a first thrust washer to include an inner circumferential surface, an outer circumferential surface and a first axial surface extending from the inner circumferential surface to the outer circumferential surface. The axial surface includes a plurality of arcuate sections and a plurality of grooves circumferentially between the arcuate sections. Each of the arcuate sections includes an arcuate axial surface including a first section, a second section and a third section. The first and third sections extend circumferentially away from the second section in opposite directions and extend axially inward from the second section. The method also includes arranging the first thrust washer axially adjacent to a stator of a first torque converter.

BRIEF DESCRIPTION OF THE DRAWINGS

The present invention is described below by reference to the following drawings, in which.

DETAILED DESCRIPTION

A bidirectional hydrodynamic thrust washer is disclosed including two tapered segments on either side of the flat surface. The tapered regions, angled oppositely, angle from radially extending grooves to the highest flat section, thus making the washer useful for rotation in both clockwise and counter-clockwise directions. The thrust washer may be used in torque converter interface locations such as between stator and impeller, stator and turbine, or flange and cover. The bidirectional hydrodynamic thrust washer advantageously has a narrow axial profile, useful for applications in which axial space is limited.

Figure 1:
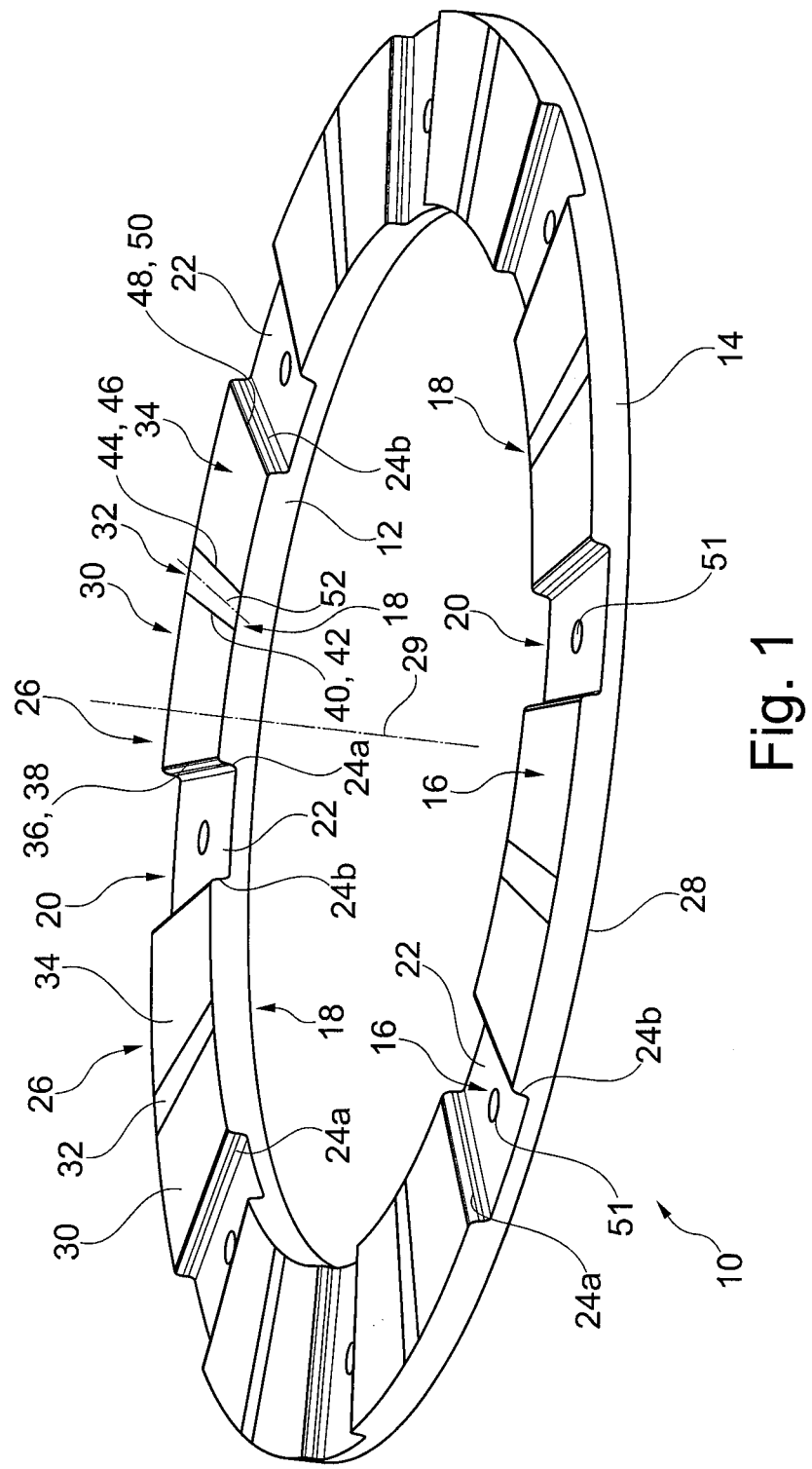
FIG. 1 shows a perspective view of a thrust washer in accordance with an embodiment of the present invention.

FIG. 1 shows a view of a first axial side of a thrust washer 10 in accordance with an embodiment of the present invention. Thrust washer 10 includes an inner circumferential surface 12 and an outer circumferential surface 14 and a first axial surface 16 extending from inner circumferential surface 12 to outer circumferential surface 14. Thrust washer 10 also includes a second axial surface 26 that on a side of thrust washer 10 that is opposite of first axial surface 16. Second axial surface 26 also extends from inner circumferential surface 12 to outer circumferential surface 14. Axial surface 16 is formed by a plurality of arcuate sections 18 and a plurality of grooves 20 circumferentially between arcuate sections 18. More specifically, arcuate sections 18 and grooves 20 are arranged in an alternating manner in the circumferential direction such that each arcuate section 18 is circumferentially between two grooves 20 and each groove is circumferentially between two arcuate sections 18. Grooves 20 are each defined by a strip 22 extending from inner circumferential surface 12 to outer circumferential surface 14 and first and second walls 24a, 24b protruding from strip 22. Walls 24a, 24b each define a radially extending circumferential edge of a respective arcuate section 18. Walls 24a, 24b each extend axially outward from strip 22 to the respective surface section 30, 34 and radially from inner circumferential surface 12 to outer circumferential surface 14.

Arcuate sections 18 each include an arcuate axial surface 26 axially offset from strips 22. Arcuate axially surfaces 26 further away from second axial surface 28 than are strips 22. Arcuate axial surfaces 26 are axial thrust surface segments and together form an axial thrust surface of thrust washer 10. Second axial surface 28 extends perpendicular to a center axis 29 of thrust washer 10, which is aligned on a center axis of rotation of the torque converter during use. Inner and outer circumferential surfaces 12, 14 extend parallel to center axis 29. Arcuate axial surfaces 26 each extend from inner circumferential surface 12 to outer circumferential surface 14 and each extend circumferentially from one first wall 24a to one second wall 24b. Each arcuate axial surface 26 is formed by three circumferential surface sections—a first inclined surface section 30, a flat surface section 32 and a second inclined surface section 34. Each section 30, 32, 34 extends radially from inner circumferential surface 12 to outer circumferential surface 14.

First inclined surface section 30 tapers axially outward away from a first circumferential edge 36 thereof, which is coincident with an axially outermost edge 38 of wall 24a, to a second circumferential edge 40 thereof, which is coincident with a first circumferential edge 42 of flat surface section 32. Accordingly, arcuate section 18 is axially thicker at second circumferential edge 40 of first inclined surface section 30 than at first circumferential edge 36 of first inclined surface section 30. Flat surface section 32 is not axially inclined and extends from its first circumferential edge 42 to a second circumferential edge 44 thereof without extending axially. In other words, flat surface section 32 is parallel with second axial surface 28 and perpendicular to center axis 29. At flat surface section 32, arcuate 18 has a constant thickness. Second inclined surface section 34 tapers axially inward away from a first circumferential edge 46 thereof, which is coincident with second circumferential edge 44 of flat surface section 32, to a second circumferential edge 48 thereof, which is coincident with an axially outermost edge 50 of wall 24b. Accordingly, arcuate section 18 is axially thicker at first circumferential edge 46 of second inclined surface section 34 than at second circumferential edge 48 of inclined surface 18. In order to fix thrust washer 10 to an axial surface of a stator via a connector, for example a rivet or bolt, each strip 22 is provided with a through hole 51 extending axially therethrough for receiving one of the connectors.

Each arcuate section 18 is symmetrically formed with respect to a circumferential center 52 of flat surface section 32, with first and second inclined surface sections 30, 34 both being tapered axially inward from flat surface section 32 toward the respective adjacent groove 20. The axially inward taper configuration of sections 30, 34 allows thrust washer 10 to be used for axially contacting both rotational directions.

Figure 2:
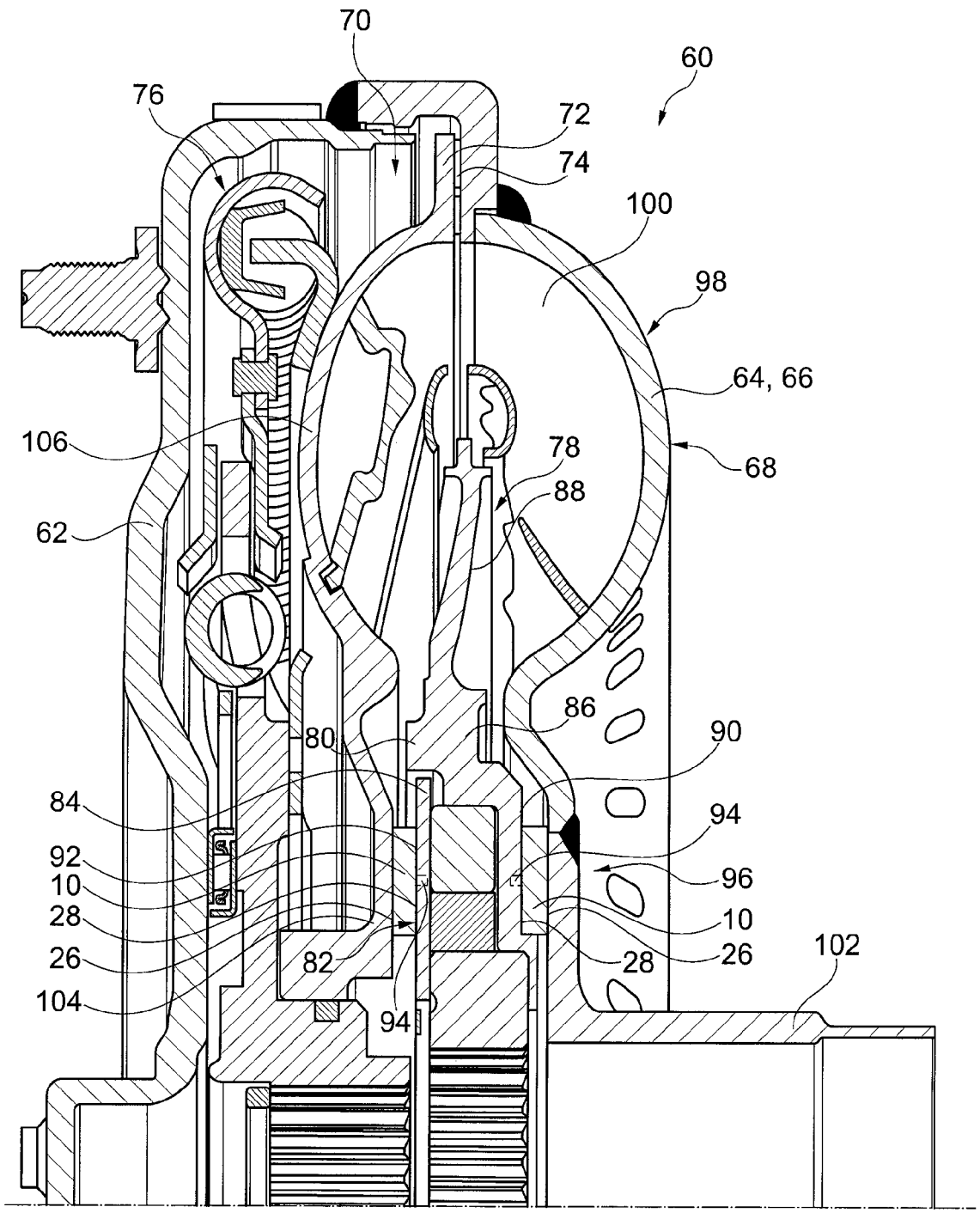
FIGS. 2 and 3 show torque converters in accordance with embodiments of the present invention.

FIG. 2 shows a torque converter 60 in accordance with an embodiment of the present invention. Torque converter 60 includes a front cover 62 for connecting to a crankshaft of an internal combustion engine and a rear cover 64 forming a shell 66 of an impeller or pump 68. Torque converter 60 also includes turbine 70 including an outer radial extension 72 radially protruding outwardly from an outer circumference of a blade supporting portion of turbine 70. Turbine 70 is configured to be axially slidable toward and away from impeller 68 to engage and disengage impeller 68. A friction material 74 is bonded onto a surface of outer radial extension 72 for engaging rear cover 64. Turbine 70 is connected to a damper assembly 76 that is circumferentially drivable by turbine 70 and is positioned between turbine 70 and front cover 62. Torque converter 60 also includes a stator 78 between turbine 70 and impeller 68. Stator 78 includes a casting 80, a one-way clutch 82 supporting casting 80 and a centering plate 84 holding one-way clutch 82 in place within stator 78.

Stator casting 80 includes a body 86 receiving one-way clutch 82 and a plurality of blades 88 on an outer circumference of body 86. Stator 78 includes an impeller-side axial surface 90 defined by a surface of body 86 and a turbine-side axial surface 92 defined by a surface of centering plate 84. In this embodiment, thrust bearing 10 is fixed to stator 78 at impeller-side axial surface 90 by for example connectors 94 extending through holes 51 in thrust washer 10. Second axial surface 28 is in flush contact with impeller-side axial surface 90 and first axial surface 16 faces impeller shell 66. Specifically, the thrust surface of thrust washer 10, i.e., arcuate axial surfaces 26, axially faces an axial surface of a radially extending portion 96 of impeller shell 16 that is between a rounded portion 98 supporting blades 100 of impeller 68 and a hub 102 of impeller 68. Thrust washer 10 on impeller-side axial surface 90 is arranged and configured so as to maintain a hydrodynamic film that prevents the axial thrust surface of thrust washer 10 from contacting impeller shell 66.

Figure 3:
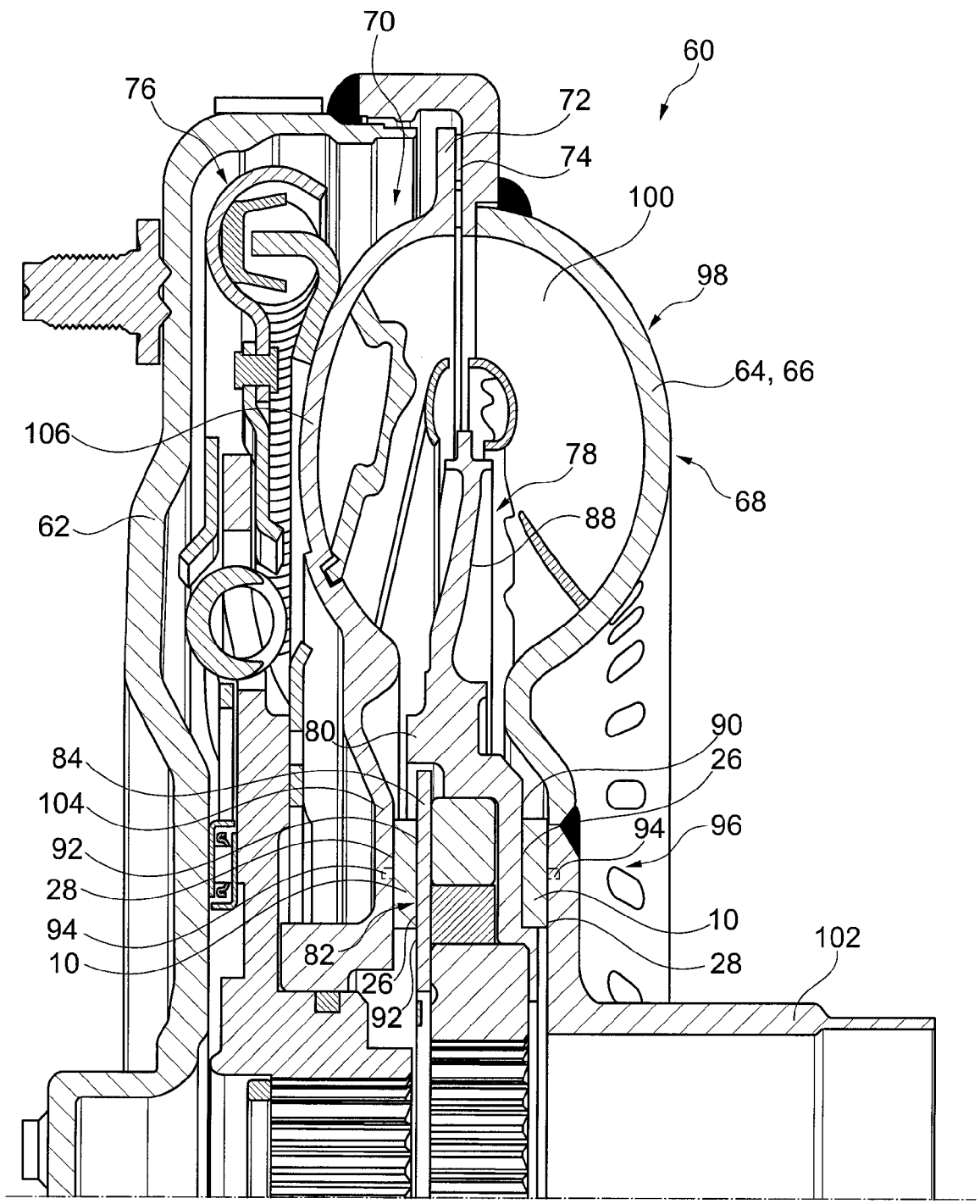

The bi-directionality of thrust washer 10 allows thrust washer 10 to be used in other arrangements within torque converter 60, with the thrust surface facing either front cover 62 or facing rear cover 64. Accordingly, as shown in FIG. 2, another thrust washer 10 may be fixed to stator 78 at the turbine-side axial surface 92 by connectors 94. Thrust washer 10 on turbine-side axial surface 92 is arranged and configured so as to maintain a hydrodynamic film that prevents the axial thrust surface of thrust washer 10 from contacting a radially extending portion 104 of turbine 70 that is radially inside of a rounded portion 106 supporting blades 10 of turbine 70. FIG. 2 thus shows two thrust washers axially adjacent to a first stator of a first torque converter In another example, FIG. 3 shows one thrust washer 10 fixed to radially extending portion 96 of impeller shell 66 by connectors 94 and another thrust washer 10 fixed to radially extending portion 104 of turbine 70 by connectors 94. The thrust washer 10 fixed to turbine 70 is arranged and configured so as to maintain a hydrodynamic film that prevents the axial thrust surface of thrust washer 10 from contacting turbine-side axial surface 92 of stator 78 and the thrust washer 10 fixed to impeller 68 is arranged and configured so as to maintain a hydrodynamic film that prevents the axial thrust surface of thrust washer 10 from contacting impeller-side axial surface 90.

In other embodiments, instead of connectors 94, thrust washer 10 may be attached to stator 78, turbine 70 or impeller 68 by different connectors, for example snap fit connectors and/or include an anti-rotation connectors, which may be integral with the snap fit connectors or located separately. The anti-rotation connectors may be a pin or a knob on thrust washer 10 able to take more load and arranged as a pin-in-hole type arrangement with an adjacent surface or plane of stator 78, turbine 70 or impeller 68.

It should be understood that the arrangements of thrust washers 10 in FIGS. 2 and 3 are exemplary and illustrate that, due to the bi-directionality of thrust washer 10, thrust washer 10 can be used on both sides of stator 78 facing both axial directions. Accordingly, a method of the invention may involve forming a plurality of identical thrust washers 10 and using the thrust washers 10 in different positions within the same or different torque converters facing different axial directions. For example, a first of the identical thrust washers 10 may be arranged adjacent to a stator 78 of a first torque converter such that the arcuate axial surfaces 26 of the second thrust washer are facing a rear cover 84 of the torque converter and a second of the identical thrust washers 10 may be arranged adjacent to a stator 78 of a second torque converter such that the arcuate axial surfaces 26 of the second thrust washer are facing a front cover 82 of the second torque converter.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A thrust washer for a torque converter comprising:
   an inner circumferential surface;
   an outer circumferential surface; and
   a first axial surface extending from the inner circumferential surface to the outer circumferential surface, the first axial surface including a plurality of arcuate sections and a plurality of grooves circumferentially between the arcuate sections, each of the arcuate sections including an arcuate axial surface including a first section, a second section and a third section, the first and third sections extending circumferentially away from the second section in opposite directions and extending axially inward from the second section,
   wherein the first and third sections include inclined surfaces and are each tapered axially inward from the second section axially toward a respective one of the grooves; wherein an axial thickness of the thrust washer at the groove is less than an axial thickness of the thrust washer at the second section.

2. The thrust washer as recited in claim 1 wherein the second section is flat and is aligned perpendicular to a center axis of the thrust washer.

3. The thrust washer as recited in claim 1 wherein each of the arcuate sections includes a first radially extending circumferential edge defined by a first axially extending wall and a second radially extending circumferential edge defined by a second axially extending wall.

4. The thrust washer as recited in claim 3 wherein each of the grooves is defined by a strip extending from the inner circumferential surface to the outer circumferential surface and by the first and second axially extending walls.

5. The thrust washer as recited in claim 4 wherein an axial surface of each of the strips is axially offset from the arcuate axial surfaces.

6. The thrust washer as recited in claim 4 wherein each of the strips includes a through hole extending axially therethrough.

7. The thrust washer as recited in claim 1 further comprising a second axial surface opposite of the first axial surface, the second axial surface being flat.

8. The thrust washer as recited in claim 1 wherein each of the first, second and third sections of the arcuate axial surface extend from the inner circumferential surface to the outer circumferential surface.

9. A torque converter comprising:
the thrust washer as recited in claim 1; and
a stator arranged axially adjacent to the thrust washer.

10. The torque converter as recited in claim 9 wherein the thrust washer is fixed to an axial surface of the stator.

11. The torque converter as recited in claim 9 further comprising a turbine, the arcuate axial surfaces of the thrust washer facing the turbine.

12. The torque converter as recited in claim 9 further comprising an impeller, the arcuate axial surfaces of the thrust washer facing the impeller.

13. The thrust washer as recited in claim 1 wherein each of the first sections includes a first radially extending circumferential edge defined by a first axially extending wall, the first axially extending wall extending axially outward from one of the grooves to the first radially extending circumferential edge, each of the third sections including a second radially extending circumferential edge defined by a second axially extending wall, the second axially extending wall extending axially outward from one of the grooves to the second radially extending circumferential edge, the inclined surface of each of the first sections being tapered axially inward from the second section to first radially extending circumferential edge, the inclined surface of each of the third sections being tapered axially inward from the second section to the second radially extending circumferential edge.

14. The thrust washer as recited in claim 13 wherein each of the second sections has a constant axial thickness that is greater than an axial thickness of each of the first sections at the first radially extending circumferential edge and that is greater than an axial thickness of each of the third sections at the second radially extending circumferential edge.

15. The thrust washer as recited in claim 1 wherein each of the first sections and each of the third sections are circumferentially wider than each of the second sections.

16. A method for forming at least one torque converter comprising:
forming a first thrust washer to include an inner circumferential surface, an outer circumferential surface and a first axial surface extending from the inner circumferential surface to the outer circumferential surface, the first axial surface including a plurality of arcuate sections and a plurality of grooves circumferentially between the arcuate sections, each of the arcuate sections including an arcuate axial surface including a first section, a second section and a third section, the first and third sections extending circumferentially away from the second section in opposite directions and extending axially inward from the second section, wherein the first and third sections include inclined surfaces and are each tapered axially inward from the second section axially toward a respective one of the grooves; and
arranging the first thrust washer axially adjacent to a stator of a first torque converter; forming an axial thickness of the thrust washer at the groove to be less than an axial thickness of the thrust washer at the second section.

17. The method as recited in claim 16 wherein thrust washer is formed such that the second section is flat and is aligned perpendicular to a center axis of the thrust washer.

18. The method as recited in claim 16 further comprising:
forming a second thrust washer identical to the first thrust washer; and
arranging the second thrust washer axially adjacent to a stator of a second torque converter such that the arcuate axial surfaces of the second thrust washer are facing a rear cover of the second torque converter,
the arranging of the first thrust washer including arranging the first thrust washer such that the arcuate axial surfaces of the first thrust washer are facing a front cover of the first torque converter.

19. The method as recited in claim 16 further comprising:
forming a second thrust washer identical to the first thrust washer; and
arranging the second thrust washer axially adjacent to the stator of the first torque converter such that the arcuate axial surfaces of the second thrust washer are facing a rear cover of the first torque converter,
the arranging of the first thrust washer including arranging the first thrust washer such that the arcuate axial surfaces of the first thrust washer are facing a front cover of the first torque converter.

20. The method as recited in claim 16 wherein each of the first sections includes a first radially extending circumferential edge defined by a first axially extending wall, the first axially extending wall extending axially outward from one of the grooves to the first radially extending circumferential edge, each of the third sections including a second radially extending circumferential edge defined by a second axially extending wall, the second axially extending wall extending axially outward from one of the grooves to the second radially extending circumferential edge, the inclined surface of each of the first sections being tapered axially inward from the second section to first radially extending circumferential edge, the inclined surface of each of the third sections being tapered axially inward from the second section to the second radially extending circumferential edge.

* * * * *